J. H. BURKE.
CUTTER HEAD.
APPLICATION FILED JAN. 15, 1910.
974,234.
Patented Nov. 1, 1910.
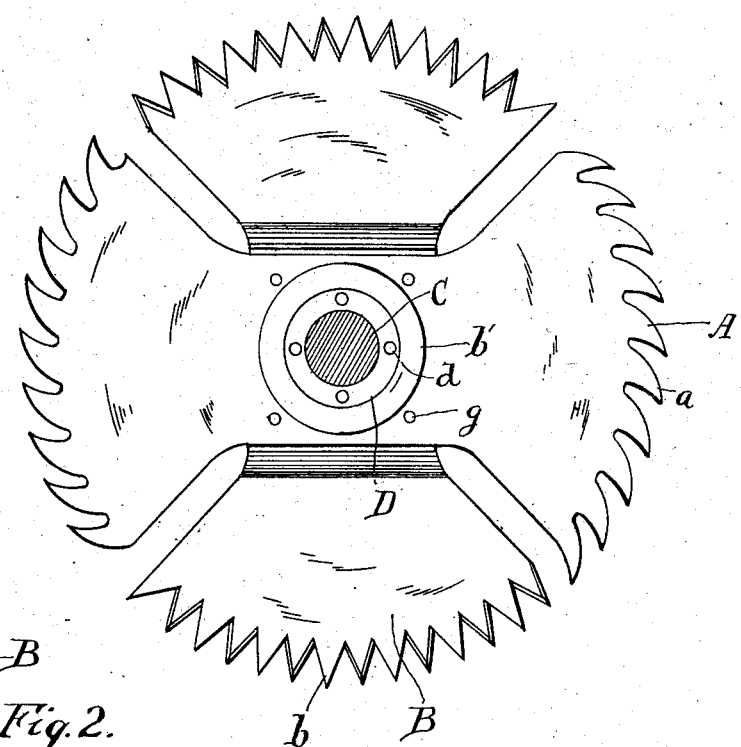
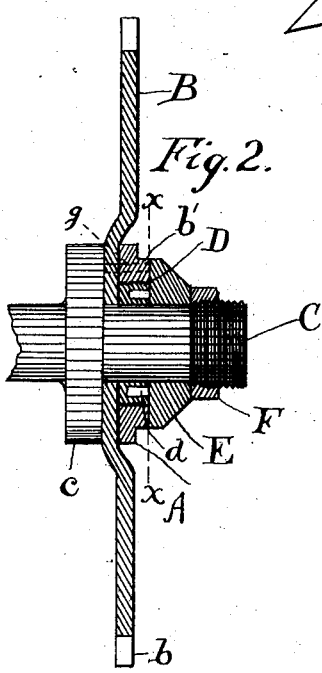
Witnesses:
Eleanor W. Dennis
Percy M. Andrews
Inventor:
Joseph H. Burke
by S. W. Bates
his atty

UNITED STATES PATENT OFFICE.

JOSEPH H. BURKE, OF PORTLAND, MAINE.

CUTTER-HEAD.

974,234.  Specification of Letters Patent.  Patented Nov. 1, 1910.

Application filed January 15, 1910. Serial No. 538,221.

*To all whom it may concern:*

Be it known that I, JOSEPH H. BURKE, a subject of the King of Great Britain, and a resident of Portland, in the county of Cumberland, State of Maine, have invented certain new and useful Improvements in Cutter-Heads, of which the following is a specification.

My invention relates to expansion cutter heads designed to be used for cutting grooves of various widths such as is commonly known as "groovers" and it is particularly designed for cutting comparatively narrow grooves in the manufacture of window sashes and the like.

The object of my invention is to construct a groover of this class which will be simple, easily adjusted and cheaply manufactured.

I have illustrated my invention in the accompanying drawing in which—

Figure 1 is a front elevation of the groover showing a section taken on the arbor on the line $x$ $x$ of Fig. 2, and Fig. 2 is a central vertical section taken longitudinally of the arbor.

In the drawing, C represents the arbor with an annular flange $c$ formed integral therewith.

The groover proper is made up of two cutter plates A and B each of which has an expanded outer end provided with cutting teeth $a$ and $b$ respectively and a laterally contracted central portion. These plates are disposed at right angles with their central portions overlapping. The central portions of the two plates are so formed that when the cutter head is closed up to cut its narrowest groove, the teeth on the outer ends of the two cutters will come in the same plane. As here shown, the center of the plate B is offset so as to form a central recess the width and thickness of the central portion of the plate A so that the latter lies in said recess and completely fills it. The plate A is made straight and not offset so that when the plates are in contact the edges are in the same plane. The outer ends of the plates are so far expanded that their adjacent edges come nearly together so that each cutting section has as many teeth as possible. The plates are separated by means of a bushing D which fits the arbor and is provided with a screw periphery which fits a screw opening formed in the central portion of the plate A. In order to give the screw thread of the bushing a good bearing in the plate A, I form the center of the plate with a thickened or reinforced portion $b'$ and the bushing D is made of the same thickness as the thickened portion of the plate A. Wrench holes $d$ are formed in the bushing D to receive a spanner for the purpose of adjustment and a collar E fits over the arbor impinging against the outer face of the plate A with a nut F holding on the collar and securing all the parts together.

When it is desired to expand the cutter, the collar and nut are removed and the cutter taken from the arbor and the bushing is then screwed inward by means of a suitable wrench and the plate A is thus drawn away from plate B. The cutter head is then placed on the arbor and secured in place by the collar E and nut F, the collar impinging against the outer face of the plate A and the inner end of the bushing impinging against the outer face of the plate B. The limit of expansion of the cutter head will evidently be from the thickness of one of the plates to the thickness of both plates combined.

A cutter head constructed according to my invention may be cheaply made, easily adjusted and is particularly well adapted for narrow grooving as in sash and door work.

The teeth may be formed according to the work which the groover has to do. I have here shown one section formed with cutting off teeth and the other with splitting teeth. With this arrangement I am able to cut either with the grain or across the grain. Instead of forming the teeth as shown such plate may be provided with cutting off teeth on one end and splitting teeth on the other so that as the parts are separated each side of the groove will be cut by first one and then the other kind of teeth.

I claim:—

1. In an expansible cutter head, the combination of an arbor having an annular flange thereon, a cutter plate as B fitting on said arbor and impinging against said flange, said plate having its opposite ends expanded and provided with a plurality of cutting teeth and having its central portion contracted laterally and offset to form a central recess, a cutting plate as A having expanded ends and laterally contracted central portion fitting in the recess of the plate B with a screw threaded central opening concentric with the arbor, a bushing fitting the arbor and impinging against the face of the plate B and having a screw thread on its outer surface engaging the screw thread in the opening in plate A, a collar impinging against said bushing and a nut on the end of the arbor for holding the parts in place.

2. In an expansible cutter head, the combination of an arbor having an annular flange thereon, a pair of cutter plates as B and A fitting on said arbor and disposed at right angles to each other, each having expanded ends provided with cutting teeth and laterally contracted central portions, the central portions of said plates being formed so that the edges come in the same plane when the cutter head is closed, the plate A having a central screw threaded opening, a bushing fitting over the arbor and having a screw threaded periphery engaging the screw thread in said opening and a collar and nut for holding the parts in place.

In witness whereof I have hereunto set my hand this 12th day of January, 1910.

JOSEPH H. BURKE.

Witnesses:
S. W. BATES,
ELEANOR W. DENNIS.